Patented Sept. 12, 1939

2,173,053

UNITED STATES PATENT OFFICE 2,173,053

DYE FOR CELLULOSE ESTERS AND ETHERS

Emmet F. Hitch, Wilmington, Del., and Donovan Erb Kvalnes, Penns Grove, N. J., assignors to E. I. du Pont de Nemours & Company, Wilmington, Del., a corporation of Delaware No Drawing. Application April 29, 1938, Serial No. 204,997

17 Claims. (Cl. 8—50)

This invention relates to dyes which are useful for dyeing cellulose esters and ethers, such as cellulose acetate silk, and especially to monazo dyes in which one of the components is from a secondary arylamine having in its amino group a polyhydroxy alkyl group. The polyhydroxy alkyl group has at least four carbon atoms and one less hydroxy group than carbons.

Heretofore benzene-azo-bis-dihydroxyethyl-aniline in which benzene is substituted by nitro or amino and benzene-azo-bis-dihydroxypropyl-aniline were known as soluble dyes for acetate silk but when the hydroxy alkyl radicals of these compounds contained four hydroxy groups the affinity of the compounds for cellulose acetate was found to be unsatisfactory. Other dyes heretofore used for dyeing acetate silk were insoluble or so nearly insoluble in water that it was necessary to pre-treat them to obtain a finely subdivided state of the dye and good dispersion thereof in the dyebath so that uneven dyeings could be avoided. In printing and often with dyeings made with such insoluble dyes, the printings and dyeings were speckled. Neither the soluble nor the insoluble dyes used heretofore had as satisfactory discharge properties as were desired; and many of the soluble dyes have not given dyeings on cellulose acetate which had satisfactory fastness to light and washing. It was therefore desirable to provide new water soluble dyes for cellulose esters and ethers which have good exhaust, discharge and fastness properties and will give level dyeings and printings.

It is among the objects of the invention to provide monazo dyes which are suitable for dyeing cellulose esters, ethers, and related materials, which dyes have sufficient solubility in water to enable them to be readily applied to the goods by dyeing and printing processes. Another object of the invention is to provide dyes having the general formula

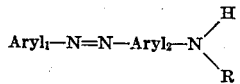

in which R is a polyhydroxy alkyl radical which contains four to six carbon atoms and one less hydroxy group than carbons. Another object of the invention is to provide dyes having satisfactory exhaust and discharge properties. Another object is to provide dyes for cellulose esters and ether materials having good fastness to light and washing. Still other objects of the invention will be apparent from the following description.

The objects of the invention may be attained in general by coupling a diazotized primary arylamine to an N-polyhydroxyalkyl, arylamine in which the polyhydroxyalkyl group has four to six carbons and one less hydroxy than carbons. Dyeings and printings may be made in general with solutions or printing compositions containing solutions of the dye.

The invention will be more fully set forth in the following more detailed description which includes examples that are given as illustrative embodiments of the invention and not as limitations thereof.

*Example 1.—Para-nitro aniline→N-sorbityl aniline*

138 parts of para-nitro aniline were suspended in 1000 parts of water and 290 parts of 31.5% hydrocloric acid. The mixture was cooled to 0–5° C. by adding ice and diazotized by adding 69 parts of sodium nitrite dissolved in 300 parts of water. 257 parts of N-sorbityl aniline were dissolved in 1500 parts of water and 116 parts of 31.5% hydrochloric acid. The mixture was cooled to 5° C. by the addition of ice and the filtered diazo solution was added thereto. To complete the coupling the mineral acidity was destroyed by the addition of 350 parts of sodium acetate trihydrate dissolved in 500 parts of water. The reaction mixture was rendered neutral by the addition of sodium hydroxide solution and the dye was isolated by filtration. The product was soluble in hot water giving an orange colored solution. The solution dyed cellulose acetate silk a heavy orange shade of good fastness to light and washing. The dyeing discharged to a clear white. The dye can be used for the printing of cellulose acetate silk to give non-specky prints. The dye is represented by the formula

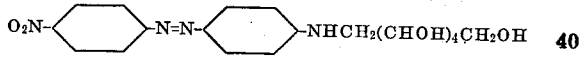

*Example 2.—2,4-dinitro aniline→N-sorbityl cresidine*

69 parts of dry sodium nitrite were added during 30 minutes to 1450 parts of 100% sulfuric acid, keeping the temperature below 25° C. by external cooling. The mixture was stirred 30 minutes. 183 parts of 2,4-dinitro aniline were added during 45 minutes to the stirred solution. The mixture was stirred for one hour and a half and the temperature was allowed to rise to 30° C. The clear solution was poured slowly onto 300 parts of ice and 100 parts of water and then filtered. 301 parts of sorbityl cresidine were dissolved in 2000 parts of water and 116 parts of 31.5% hydrochloric acid and iced to 0-5° C. The diazo was allowed to run slowly into the solution of sorbityl cresidine and then 2000 parts of sodium hydroxide dissolved in 500 parts of water were added. During the coupling the temperature was maintained below 10° C. by the addition of ice. When the reaction mixture was made neutral by the addition of a little more sodium hydroxide solution the dye was filtered off, washed with water and dried at 45° C. A solution of the dye in water warmed to 85° C. was violet and dyed cellulose acetate silk a heavy violet shade. The dye is represented by the formula

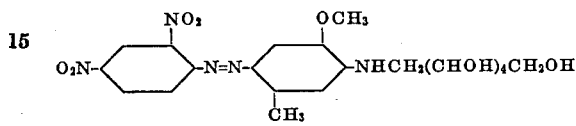

The following monazo dyes of the same general class have been prepared in a manner similar to Example 1. In the following examples the arrows point from the azo component toward the coupling component. The colors listed in the right-hand column indicate the color of the dyeings on cellulose acetate.

| Example | | |
|---|---|---|
| 3 | p-Chlor aniline——→sorbityl aniline. | Yellow. |
| 4 | p-Chlor aniline——→sorbityl cresidine. | Reddish yellow. |
| 5 | p-Chlor aniline——→sorbityl o-anisidine. | Do. |
| 6 | p-Amino acetanilide——→sorbityl aniline. | Yellow. |
| 7 | Alpha-naphthylamine——→sorbityl aniline. | Do. |
| 8 | N-(p-amino benzyl) diethanol amine——→sorbityl cresidine. | Golden yellow. |
| 9 | Glycerol mono (p-amino benzoate)——→sorbityl cresidine. | Peach. |
| 10 | 2,5-dichlor aniline——→sorbityl aniline. | Reddish yellow. |
| 11 | p-Nitro aniline——→N-pentaerythrityl aniline. | Orange. |
| 12 | p-Nitro aniline——→N-mannityl aniline. | Do. |
| 13 | p-Nitro aniline——→sorbityl m-toluidine. | Reddish orange. |
| 14 | 5-nitro-2-amino anisol——→sorbityl m-anisidine. | Scarlet. |
| 15 | 5-nitro-2-amino anisol——→sorbityl p-xylidine. | Red. |
| 16 | m-(Trifluoro methyl) aniline——→sorbityl cresidine. | Reddish yellow. |
| 17 | (p-Amino phenyl) methyl sulfone——→sorbityl aniline. | Do. |
| 18 | p-Amino acetophenone——→sorbityl aniline. | Do. |
| 19 | o-Nitro-aniline——→sorbityl-o-toluidine. | Do. |
| 20 | m-Nitro-aniline——→sorbityl aniline | Do. |
| 21 | o-Chlor-p-nitro-aniline——→sorbityl 2,5-dimethoxy aniline. | Red. |
| 22 | Picramic acid——→sorbityl cresidine | Pink. |
| 23 | 2,6-dichlor-4-nitro-aniline——→sorbityl cresidine. | Reddish brown. |
| 24 | p-Nitro-aniline——→fructyl cresidine | Scarlet. |
| 25 | m-Nitro-p-toluidine——→sorbityl aniline. | Reddish yellow. |
| 26 | 4-nitro-1-naphthylamine——→sorbityl cresidine. | Rubine. |

The invention is not restricted to the compounds shown in the examples. It includes monazo dyes which are represented generally by the formula

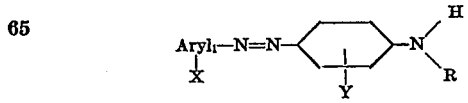

in which $Aryl_1$ is of the benzene or naphthalene series and is devoid of sulfonic acid and carboxyl groups. $Aryl_1$ and the benzene nucleus may be unsubstituted or they may be substituted once or more than once by other groups. Any primary arylamine which is devoid of the substituents, sulfonic acid and carboxyl is suitable for the amino base. Among the many substituents represented by X in the general formula are mentioned hydrogen, alkyl, alkoxy, acylamino, trifluoromethyl, nitro, halogen, hydroxy, the group —COOZ in which Z is alkyl or hydroxyalkyl, the group —$CH_2NZ_2$ where Z is alkyl or hydroxyalkyl, the group —$SO_2Z$ where Z is alkyl, aryl, aralkyl or benzyl, and —CO alkyl, such as chloro, bromo, methyl, ethyl, propyl, longer chain alkyl groups, the corresponding alkoxy groups, acetylamino, longer chain alkacylamino groups, aroylamino groups, such as benzoylamino, the groups —$COOCH_2(CHOH)CH_2OH$, $CH_3CO$—,
$CH_2N(C_2H_5)_2$ and —$SO_2C_6H_5$ The preferred diazo bases are para-nitro-anilines which may or may not be substituted by other groups.

As many substituent groups as one less than the number of carbons in $Aryl_1$ may be present. Desirable variations can usually be obtained with no more than three substituent groups, but one or two substituent groups which are alike or unlike are highly satisfactory. Numerous diazo bases are specified in the examples but many others can be used.

The benzene nucleus of the coupling component may be unsubstituted or substituted by one or more groups up to two less than the number of carbons in benzene so long as the substituent groups do not interfere with the coupling with diazotized arylamines. Satisfactory variations can ordinarily be obtained with one or two substituents in benzene but more can be present. As representative substituents are mentioned halogen, alkyl and alkoxy, such as those used for substituents in $Aryl_1$.

The symbol R stands for a polyhydroxy alkyl group having four to six carbon atoms and one less hydroxy group than carbons. The polyhydroxy alkyl group may be connected to the amino nitrogen through the carbon of an end group such as a —$CH_2$ group or a —CHOH group, or through the carbon of an intermediate group such as a —CH group. Types of polyhydroxy alkyl groups are

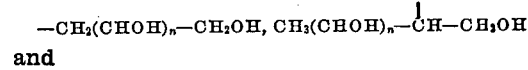

and

$n$ being an integer such that there are at least four carbons in the group. As examples of polyhydroxy alkyl groups are mentioned the radical of the alcohol sorbitol and the radical of reduced monosaccharides, such as erythrose, glucose, arabinose and still other radicals of monosaccharides having the required number of carbon and hydroxy radicals. It is to be understood that the radicals of other compounds besides those specifically mentioned can be used, such as the radical of pentaerythrythol, $C(CH_2OH)_4$.

Secondary arylamines suitable for coupling components can be made by various methods. For example, a secondary arylamine may be formed by catalytically hydrogenating a solution containing a polyhydroxy alkyl compound having the desired polyhydroxy radical and a substituted or unsubstituted primary arylamine having an open position such that coupling can be made eventually to a diazotized arylamine, the hydrogenation being carried out in the presence of a metallic hydrogenation catalyst, such as nickel or cobalt and at elevated temperatures and pressures, such as at 100° C. and 800 pounds pressure. The secondary amine can also be prepared by reacting a suitable halohydrin and the primary arylamine by methods well known to the art, such as reacting a primary arylamine and mannitol chlorhydrin, or a primary arylamine and the chlorhydrin of pentaerythritol.

In general, dyeings are made by dissolving the dyes in water and entering the material to be dyed into the heated solution. A temperature of about 85° C. is generally preferred for the dye bath but higher and lower temperatures can be used. For satisfactory results the dye bath temperatures may be about the same as the temperatures used for dyeing with insoluble dyes, namely about 75° to about 90° C. At the optimum temperatures the rate of absorption of the dyes of the invention is more rapid than dispersed insoluble dyes and in general a stronger dyeing is obtained at low temperatures with the dyes of the invention than with dyes which require fine dispersion. For example, a skein of cellulose acetate silk was dyed as follows: A dye bath was made by dissolving 0.25 part of the dye described in Example 1 in 2000 parts of hot water. Fifty parts of skein were entered in the bath which was at 85° C. and the bath was maintained at 85° C. for about 45 minutes when dyeing was completed. The skein was removed from the bath, rinsed in water, squeezed and dried. The dyeing was an even heavy orange shade having good fastness to light and washing. The dyeing discharged to a clear white. By similarly applying the dye of Example 2 in the same proportions the acetate silk was dyed a violet shade. The presence of dye in excess of that which goes into solution can be used with success, when the undissolved dye is dispersed in the solution as by the action of a dispersing agent. In making prints similar solutions of the dye are mixed with the printing vehicle, the fabric is then printed and finally steamed. The dyes of the invention give level dyeings of unusual deep shade and of excellent fastness to light on cellulose esters and ethers. Being soluble, no pretreatment to obtain finely divided particles and dispersion in the dye bath to prevent uneven dyeings is necessary. Good prints which are free from a specky appearance are obtainable with ease. The compounds are soluble in hot water, some being more soluble than others. Although soluble in hot water, the dyes have the peculiar property of having excellent fastness to washing, the fastness to washing being at least equal to the insoluble cellulose acetate dyes. The dyes discharge well and they are fast to light. They may be dyed with or without the presence of salt and consequently can be used in admixture with dispersed dyes or with dyes which require salt for exhaustion.

Since from the foregoing description of the invention it will be apparent to those skilled in the art that various other embodiments of the invention may be made without departing from the spirit and scope thereof, it is to be understood that the invention is not limited to the illustrative embodiments which are specifically set forth.

We claim:

1. As a dye for cellulose esters and ethers, a monazo compound comprising a radical of the benzene and naphthalene series which is devoid of sulfonic acid and carboxyl groups; the radical of an amine of the benzene series which is substituted at least once by a member of the group consisting of hydrogen, alkyl, alkoxy and halogen, said amine group being —NHR in which R is a polyhydroxyalkyl group having four to six carbon atoms and one less hydroxy than carbons; and an azo bridge connecting said radicals, said azo bridge being connected to said amine in a position para to —NHR.

2. As a dye for cellulose esters and ethers, a monazo compound comprising a radical of the benzene series having a single carbocyclic nucleus which is devoid of sulfonic acid and carboxyl groups; the radical of an amine of the benzene series which is substituted at least once by a member of the group consisting of hydrogen, alkyl, alkoxy and halogen, said amine group being —NHR in which R is a polyhydroxyalkyl group having four to six carbon atoms and one less hydroxy than carbons; and an azo bridge connecting said radicals, said azo bridge being connected to said amine in a position para to —NHR.

3. As a dye for cellulose esters and ethers, a monazo compound comprising two radicles of the benzene series, one of said radicals being substituted at least once by a member of the group consisting of hydrogen, alkyl, alkoxy, acylamino, trifluoromethyl, nitro, halogen, hydroxy, —COOZ in which Z is alkyl or hydroxyalkyl, —CH₂Z in which Z is alkyl or hydroxyalkyl, —SO₂Z in which Z is alkyl, aryl, aralkyl or benzyl, and —CO alkyl; the second of said radicals being substituted at least once by one of a group consisting of hydrogen, alkyl, alkoxy and halogen; an azo group bridging said radicals, and an amine group in said second radical which is para to the azo bridge, said amine group being represented by the formula —NHR in which R is a polyhydroxyalkyl group having four to six carbons and one less hydroxy than carbons.

4. As a dye for cellulose esters and ethers a compound represented by the formula

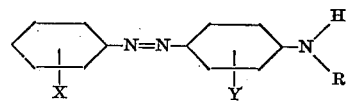

in which X is at least one of the group consisting of hydrogen, alkyl, alkoxy, acylamino, trifluoromethyl, nitro, halogen, hydroxy, —COOZ in which Z is alkyl or hydroxyalkyl, —CH₂Z in which Z is alkyl or hydroxyalkyl, —SO₂Z in which Z is alkyl, aryl, aralkyl or benzyl and —CO alkyl, Y is at least one of the group consisting of hydrogen, alkyl, alkoxy and halogen, and R is a polyhydroxyalkyl group having four to six carbons and one less hydroxy than carbons.

5. As a dye for cellulose esters and ethers a compound represented by the formula

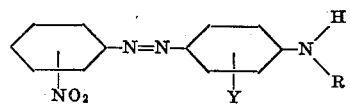

in which Y is at least one of the group consisting of hydrogen, alkyl, alkoxy and halogen, and R is a polyhydroxy alkyl group having four to six carbons and one less hydroxy than carbons.

6. As a dye for cellulose esters and ethers a compound represented by the formula

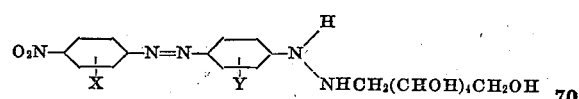

in which X is at least one of the group consisting of hydrogen, alkyl, alkoxy, acylamino, trifluoromethyl, nitro, halogen, hydroxy, —COOZ in which Z is alkyl or hydroxyalkyl, —CH₂Z in which Z is alkyl or hydroxyalkyl, —SO₂Z in which Z is alkyl, aryl aralkyl or benzyl and —CO alkyl, Y is at least one of the group consisting of hydrogen, alkyl, alkoxy and halogen, and R is a polyhydroxyalkyl group having four to six carbons and one less hydroxy than carbons.

7. As a dye for cellulose esters and ethers the compound represented by the formula

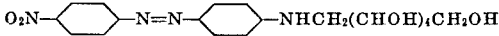

8. As a dye for cellulose esters and ethers the compound represented by the formula

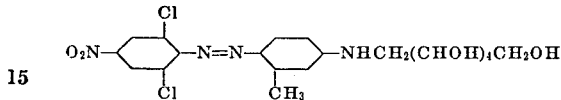

9. As a dye for cellulose esters and ethers the compound represented by the formula

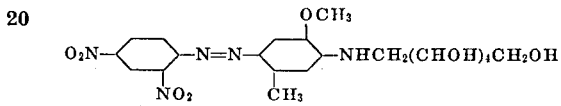

10. The process of dyeing cellulose ester and ether materials which comprises impregnating the material with an aqueous solution of the dye of claim 1 which is heated to a temperature between about 75° and about 90° C. until the material is dyed.

11. The process of dyeing cellulose ester and ether materials which comprises impregnating the material with an aqueous solution of the dye of claim 2 which is heated to a temperature between about 75° and about 90° C. until the material is dyed.

12. The process of dyeing cellulose ester and ether materials which comprises impregnating the material with an aqueous solution of the dye of claim 3 which is heated to a temperature between about 75° and about 90° C. until the material is dyed.

13. The process of dyeing cellulose ester and ether materials which comprises impregnating the material with an aqueous solution of the dye of claim 4 which is heated to a temperature between about 75° and about 90° C. until the material is dyed.

14. The process of dyeing cellulose ester and ether materials which comprises impregnating the material with an aqueous solution of the dye of claim 5 which is heated to a temperature between about 75° and about 90° C. until the material is dyed.

15. The process of dyeing cellulose ester and ether materials which comprises impregnating the material with an aqueous solution of the dye of claim 6 which is heated to a temperature between about 75° and about 90° C. until the material is dyed.

16. The process of dyeing cellulose ester and ether materials which comprises impregnating the material with an aqueous solution of the dye of claim 7 which is heated to a temperature between about 75° and about 90° C. until the material is dyed.

17. The process of dyeing cellulose ester and ether materials which comprises impregnating the material with an aqueous solution of the dye of claim 8 which is heated to a temperature between about 75° and about 90° C. until the material is dyed.

EMMET F. HITCH.
DONOVAN ERB KVALNES.